United States Patent [19]

Kavassalis et al.

[11] Patent Number: 5,209,998
[45] Date of Patent: May 11, 1993

[54] COLORED SILICA PARTICLES

[75] Inventors: Tom A. Kavassalis, Waterdown; Francoise M. Winnik, Toronto, both of Canada

[73] Assignee: Xerox Corporation, Stamford, Conn.

[21] Appl. No.: 797,596

[22] Filed: Nov. 25, 1991

[51] Int. Cl.$^5$ .................... G03G 9/135; G03G 9/093
[52] U.S. Cl. .................... 430/106; 430/114; 430/115; 430/126; 430/138; 428/404
[58] Field of Search ............. 430/114, 110, 109, 106, 430/137, 126; 428/404

[56] References Cited

U.S. PATENT DOCUMENTS

| | | | |
|---|---|---|---|
| 3,691,090 | 9/1972 | Kitajima et al. | 252/316 |
| 4,409,039 | 10/1983 | Lepesant et al. | 106/20 |
| 4,439,510 | 3/1984 | McLouglin | 430/137 |
| 4,680,200 | 7/1987 | Solc | 427/213.34 |
| 4,840,674 | 6/1989 | Schwarz | 106/22 |
| 4,977,052 | 12/1990 | Mikami | 430/98 |
| 5,102,763 | 4/1992 | Winnik et al. | 430/109 |
| 5,104,763 | 4/1992 | Ong et al. | 430/109 |

Primary Examiner—John Goodrow
Attorney, Agent, or Firm—Judith L. Byorick

[57] ABSTRACT

Disclosed is a composition which comprises silica particles containing a water soluble dye entrapped therein, said silica particles being coated with a surfactant. The particles can be prepared by a process which comprises preparing a mixture of a surfactant and an organic solvent immiscible with water and capable of forming a stable microemulsion with water, adding to the mixture a solution of a water-soluble dye, a hydrolyzing reagent, and water to form a microemulsion of water domains within a continuous phase of the organic solvent, and adding to the microemulsion a tetraalkoxysilane, wherein the tetraalkoxysilane reacts with the hydrolyzing agent to form in each water domain a silica particle containing the water-soluble dye and coated with the surfactant. The particles are useful as colorants for various organic materials, such as dry electrostatic toners, liquid electrostatic toners, plastics, oil based inks, hot melt ink jet inks, and the like.

37 Claims, 1 Drawing Sheet

COLORED SILICA PARTICLES

BACKGROUND OF THE INVENTION

The present invention is directed to colored particles and process for the preparation thereof. More specifically, the present invention is directed to colored particles comprising silica particles containing a water soluble dye entrapped therein, said silica particles being coated with a surfactant. One specific embodiment of the present invention is directed to electrostatic toner compositions comprising a resin and colored particles comprising silica particles containing a water soluble dye entrapped therein, said silica particles being coated with a surfactant. The colored particles of the present invention are also suitable for other applications, such as colorants for plastics, colorants for liquid electrostatic developers, colorants for oil based inks, such as those used in ball point pens and other writing implements, colorants for hot melt ink jet inks, and the like.

Known colorant materials generally consist of pigments or dyes. Pigments generally are particulate colored materials that are dispersed in the material to be colored, whereas dyes generally are compositions which color other materials either by becoming dissolved or dispersed in the material to be colored or by reacting chemically with the material to be colored.

One example of a material that contains a colorant is an electrostatic toner for electrostatic printing processes. The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. Toner typically comprises a resin and a colorant. The toner will normally be attracted to those areas of the photoreceptor which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Another known process for forming electrostatic images is ionography. In ionographic imaging processes, a latent image is formed on a dielectric image receptor or electroreceptor by ion deposition, as described, for example, in U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally incorporated herein by reference. Generally, the process entails application of charge in an image pattern with an ionographic writing head to a dielectric receiver that retains the charged image. The image is subsequently developed with a developer capable of developing charge images.

Many methods are known for applying the electroscopic particles to the electrostatic latent image to be developed. One development method, disclosed in U.S. Pat. No. 2,618,552, the disclosure of which is totally incorporated herein by reference, is known as cascade development. Another technique for developing electrostatic images is the magnetic brush process, disclosed in U.S. Pat. No. 2,874,063. This method entails the carrying of a developer material containing toner and magnetic carrier particles by a magnet. The magnetic field of the magnet causes alignment of the magnetic carriers in a brushlike configuration, and this "magnetic brush" is brought into contact with the electrostatic image bearing surface of the photoreceptor. The toner particles are drawn from the brush to the electrostatic image by electrostatic attraction to the undischarged areas of the photoreceptor, and development of the image results. Other techniques, such as touchdown development, powder cloud development, and jumping development are known to be suitable for developing electrostatic latent images.

U.S. Pat. No. 4,439,510 (McLoughlin) discloses a method of preparing electroscopic marking particles comprising encapsulating an ink using an aqueous phase emulsion solution including an albumin stabilizer which becomes hydrophobic during processing to give relatively dry, non-tacky particles.

U.S. Pat. No. 4,680,200 (Solc) discloses colloidal size particles of an organic solid such as a pigment that are encapsulated in a hydrophobic addition polymer such as a polymer of styrene by a polymerization process wherein a water-immiscible (hydrophobic) monomer is dispersed in an aqueous colloidal dispersion of the organic particles and subjected to conditions of emulsion polymerization. The resulting encapsulated particles are useful as toners and pigments.

U.S. Pat. No. 4,977,052 (Mikami) discloses an electrostatographic toner material suitably employable for the pressure fixing process, which comprises encapsulated toner particles having an average particle size in the range from about 0.5 to 1,000 microns, in which the toner particle comprises a pressure fixable adhesive core material containing a colorang and a pressure rupturable shell enclosing the core material, said shell being made of a polymer selected from the group consisting of polyurethane, polyurea, and polythiourethane. The patent also discloses a process for preparing the toner material.

U.S. Pat. No. 3,691,090 (Kitajima et al.) discloses a process for the preparation of capsules containing a core material which comprises dispersing the core material in a solution of an organic solvent and an encapsulating material, dispersing the dispersion in an aqueous inorganic salt solution, and then removing the organic solvent.

U.S. Pat. No. 4,409,039 (Lepesant et al.) discloses a high stability printing liquid intended for ink jet printing which is in the state of a microemulsion formed by a dispersing phase containing a group of intercompatible constituents and a dispersed phase containing a second group of intercompatible constituents, the constituents of the first and second groups being incompatible with one another. The two phases are separated by an interfacial liquid containing surfactant molecules in such a way that the dispersed phase is in the form of globules of 500 to 1,000 Angstroms.

U.S. Pat. No. 4,840,674 (Schwarz) discloses an improved ink composition comprising a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes such as black, yellow, cyan, magenta, brown, and mixtures thereof.

U.S. Pat. No. 4,877,451 (Winnik et al.) discloses an ink jet ink composition which comprises water, a solvent, and a plurality of colored particles comprising hydrophilic porous silica particles, to the surfaces of which dyes are covalently bonded through silane coupling agents. The particles are prepared by a process which comprises reacting hydrophilic porous silica particles with a silane coupling agent in the absence of water to form particles having covalently attached thereto coupling agents, followed by reacting a dye with the coupling agent attached to the silica particles.

U.S. Pat. No. 4,879,199 (Moffat et al.) discloses a process for controlling the electrical characteristics of colored toner particles. The process comprises preparing a first core material comprising first pigment particles, core monomers, a free radical initiator, and optional polymer components, preparing a second core material which comprises second pigment particles, core monomers, a free radical initiator, and optional polymer components, said second pigment particles being of a different color from that of the first pigment particles, encapsulating separately the first core material and the second core material within polymeric shells by means of interfacial polymerization reactions between at least two shell monomers, of which at least one is soluble in aqueous media and at least one of which is soluble in organic media, wherein the polymeric shell encapsulating the first core material is of substantially the same composition as the polymeric shell encapsulating the second core material, and subsequently polymerizing the first and second core monomers via free radical polymerization, thereby producing two encapsulated heat fusible toner compositions of different colors with similar triboelectric charging characteristics.

P. Espiard et al., "A Novel Technique for Preparing Organophilic Silica by Water-In-Oil Microemulsions," *Polymer Bulletin*, vol. 24, pages 173 to 170 (Spring 1990), the disclosure of which is totally incorporated herein by reference, discloses a technique for preparing ultramicro spherical silica particles containing vinyl groups on their surfaces by a combination of the sol-gel technique and the water-in-oil emulsion technique in which hydrolysis and condensation of tetraethyl siloxane and trimethoxysilylpropylmethacrylate take place. Spherical silica particles with a size range from 20 to 70 nanometers were obtained and the surface concentrations of the double bonds per square nanometer were from 4 to 7.

H. Yamauchi et al., "Surface Characterization of Ultramicro Spherical Particles of Silica Prepared by W/O Microemulsion Method, *Colloids and Surfaces*, vol. 37, pages 71 to 80 (1989), the disclosure of which is totally incorporated herein by reference, discloses the preparation of ultramicro spherical particles of colloidal silica by the hydrolysis of tetraethoxysilane in the water pool of a water-in-oil (isooctane) microemulsion using Aerosol-OT. The average diameter of the silica spheres obtained was of the order of 10 nanometers and their surface areas were about 100 to 300 square meters per gram. The nitrogen adsorption isotherms of this material showed that the particles have micropores, in contrast to colloidal nonporous silica particles such as aerosils and those in silica sols having a similar size of particle.

Copending application U.S. Ser. No. 07/495,669, filed Mar. 19, 1990, entitled "Toner Compositions Containing Colored Silica Particles," with the named inventors Françoise M. Winnik, David J. Luca, and Thomas W. Smith, discloses a toner composition which comprises a resin, hydrophilic silica particles having dyes covalently bonded to the particle surfaces through silane coupling agents, and a polymer having at least one segment capable of enhancing the dispersibility of the silica particles in the resin and at least one segment capable of adsorbing onto the surface of the silica particles. In one embodiment, the polymer segment capable of adsorbing onto the surface of the silica particles is ionophoric and capable of complexing with a salt, thereby incorporating a toner charge control additive into the polymer.

Copending U.S. application Ser. No. 07/369,003, filed Jun. 23, 1989, entitled "Inks and Liquid Developers Containing Colored Silica Particles," with the named inventors Françoise M. Winnik, Barkev Keoshkerian, Raymond W. Wong, Stephan Drappel, Melvin D. Croucher, James D. Mayo, and Peter G. Hofstra, discloses ink jet inks and liquid developers which contain colored particles comprising hydrophilic silica particles, to the surfaces of which dyes are covalently bonded through silane coupling agents. The ink jet inks generally comprise a liquid medium and a plurality of the colored silica particles. The liquid developers generally comprise a liquid medium, a resin, a plurality of the colored silica particles, and a charge control agent. The particles are prepared by a process which comprises reacting hydrophilic silica particles with a silane coupling agent in the absence of water to form particles having covalently attached thereto coupling agents, followed by reacting a dye with the coupling agent attached to the silica particles.

Although known compositions and processes are suitable for their intended purposes, a need remains for new colorant materials. In addition, a need remains for new colorant materials suitable for use in electrostatic toner compositions. Further, a need remains for colorants that are available in a wide variety of colors and that can be formulated in any desired color. There is also a need for colorant particles suitable for use in electrostatic toner compositions wherein colorant particles of different colors have similar triboelectric characteristics; generally, when known pigment particles are used as colorants in electrostatic toners, the pigments vary greatly in their triboelectric characteristics, so that interchangeable toners of different colors cannot be made simply by changing the pigment employed without varying other components of the developer. Additionally, there is a need for new colorant materials suitable for use in electrostatic toner compositions that exhibit a high degree of dispersion within the toner resin. Further, there is a need for new colorant materials suitable for use in electrostatic toner compositions that are of small particle size, thereby enabling formation of transparent colored toners that can be used to form images on transparencies for overhead projectors, wherein the projected images are of substantially the same color as the toner employed to form the image. There is also a need for colored particles which can be used to produce colored plastics by admixing the colorant particles with the plastic material. In addition, there is a need for colored particles which are suitable for use as colorants for liquid electrostatic developers. Further, there is a need for colored particles which are suitable for use as colorants for oil-based inks. Additionally, there is a need for colored particles which are suitable for use as colorants for hot melt ink jet inks.

SUMMARY OF THE INVENTION

It is an object of the present invention to provide new colorant materials.

It is another object of the present invention to provide new colorant materials suitable for use in electrostatic toner compositions.

It is yet another object of the present invention to provide colorants that are available in a wide variety of colors and that can be formulated in any desired color.

It is still another object of the present invention to provide colorant particles suitable for use in electrostatic toner compositions wherein colorant particles of different colors have similar triboelectric characteristics.

Another object of the present invention is to provide new colorant materials suitable for use in electrostatic toner compositions that exhibit a high degree of dispersion within the toner resin.

Yet another object of the present invention is to provide new colorant materials suitable for use in electrostatic toner compositions that are of small particle size, thereby enabling formation of transparent colored toners that can be used to form images on transparencies for overhead projectors, wherein the projected images are of substantially the same color as the toner employed to form the image.

Still another object of the present invention is to provide colored particles which can be used to produce colored plastics by admixing the colorant particles with the plastic material.

It is another object of the present invention to provide colored particles which are suitable for use as colorants for liquid electrostatic developers.

It is yet another object of the present invention to provide colored particles which are suitable for use as colorants for oil-based inks.

It is still another object of the present invention to provide colored particles which are suitable for use as colorants for hot melt ink jet inks.

These and other objects of the present invention (or specific embodiments thereof) can be achieved by providing colorant particles which comprise silica particles containing a water soluble dye entrapped therein, said silica particles being coated with a surfactant. Another embodiment of the present invention is directed to a toner composition comprising a resin and colorant particles which comprise silica particles containing a water soluble dye entrapped therein, said silica particles being coated with a surfactant. Yet another embodiment of the present invention is directed to a process for preparing colorant particles which comprises preparing a mixture of a surfactant and an organic solvent immiscible with water and capable of forming a stable microemulsion with water, adding to the mixture a solution of a water-soluble dye, a hydrolyzing reagent, and water to form a microemulsion of water domains within a continuous phase of the organic solvent, and adding to the microemulsion a tetraalkoxysilane, wherein the tetraalkoxysilane reacts with the hydrolyzing agent to form in each water domain a silica particle containing the water-soluble dye and coated with the surfactant. Still another embodiment of the present invention is directed to a process for preparing particles which comprises preparing a mixture of a surfactant and an organic solvent immiscible with water and capable of forming a stable microemulsion with water, adding to the mixture a solution of a hydrolyzing reagent and water to form a microemulsion of water domains within a continuous phase of the organic solvent, adding to the microemulsion a water-soluble dye to form a colored microemulsion, and adding to the colored microemulsion a tetraalkoxysilane, wherein the tetraalkoxysilane reacts with the hydrolyzing agent to form in each water domain a silica particle containing the water-soluble dye and coated with the surfactant.

DETAILED DESCRIPTION OF THE PREFERRED EMBODIMENTS

Figure 1:
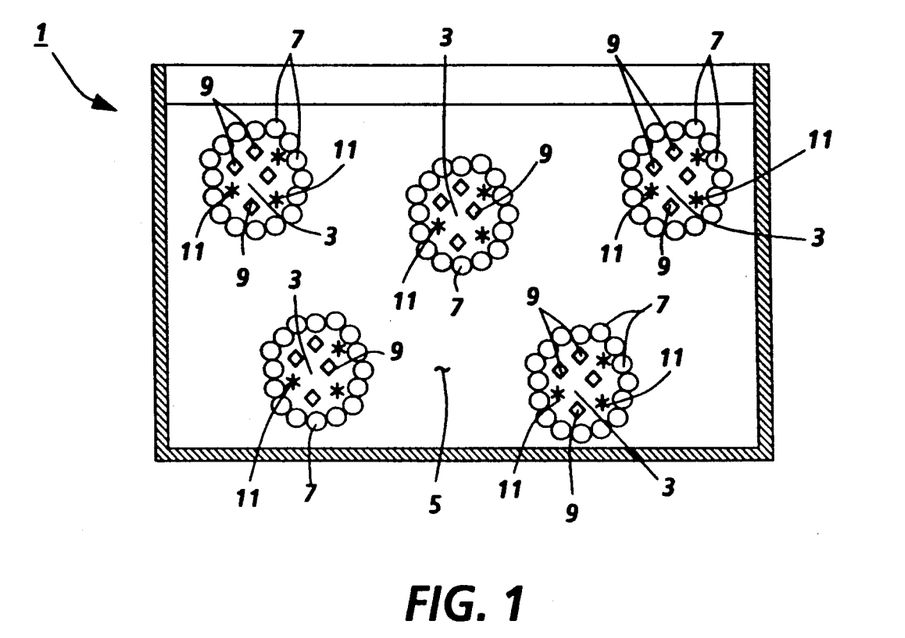
FIGS. 1 and 2 illustrate schematically a preparation process for the colored particles of the present invention.
Figure 2:
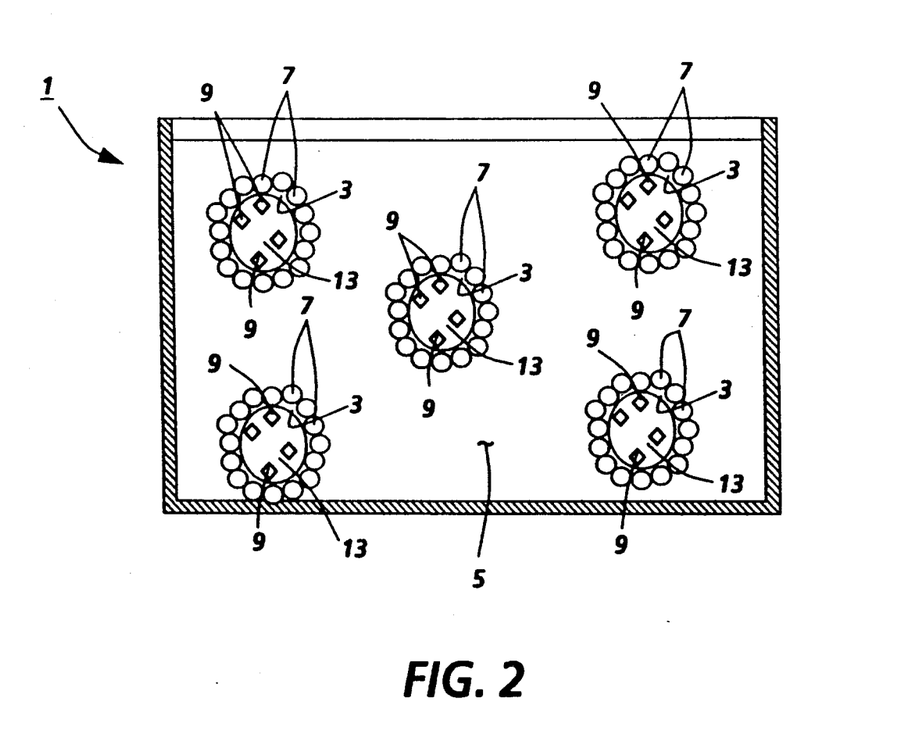

The colorant particles of the present invention comprise silica particles containing a water soluble dye entrapped within the silica, wherein the silica particles are coated with a surfactant. The particles of the present invention are prepared by the hydrolysis of a tetraalkoxysilane in stable water-in-oil microemulsions. The stable microemulsions are formed by mixing together water, an organic solvent immiscible with water and capable of forming a stable microemulsion with water, a water-soluble dye, a hydrolyzing agent, and one or more surfactants. The water-soluble dye is contained in the aqueous phase of the water-in-oil microemulsion. Subsequently, silica is synthesized in the water phase of the microemulsion by adding to the emulsion a tetraalkoxysilane and hydrolyzing it to form silica particles. Following the silica formation, the dye molecules in the water phase are enclosed into small silica particles which are surrounded by a surfactant. A preparation scheme is as shown in the Figures.

As illustrated schematically in FIG. 1, a water-in-oil microemulsion 1 is formed wherein small pools of water 3 are formed in the organic continuous phase 5. The surfactant 7 surrounds the pools of water 3. Molecules of a water soluble dye 9 and hydrolyzing reagent 11 are dissolved in pools of water 3.

Subsequently, a tetraalkoxysilane is added to the microemulsion 1, and, as illustrated schematically in FIG. 2, the tetraalkoxysilane reacts with the hydrolyzing reagent to form silica particles 13 in pools of water 3. Contained within silica particles 13 are dye molecules 9, and contained on the surfaces of silica particles 13 is surfactant 7.

Examples of suitable organic solvents for the process of the present invention include aliphatic hydrocarbons, such as n-hexane, n-heptane, n-octane, n-decane, n-dodecane, iso-heptane, iso-octane, isoparaffinic hydrocarbons such as Isopar® M, available from Exxon Corporation, cyclopentane, cyclohexane, cycloheptane, methylcyclohexane, and the like, as well as mixtures thereof, aromatic hydrocarbons, such as benzene, toluene, o-xylene, m-xylene, p-xylene, ethyl-benzene, 1,3,5-trimethylbenzene, styrene, and the like, as well as mixtures thereof, and substituted aromatic hydrocarbons, such as chlorobenzene, bromobenzene, 1-bromonaphthalene, and the like, as well as mixtures thereof. The organic solvent is present in any effective amount; typically, the organic solvent is present with respect to the water in a ratio between about 1 part by weight organic solvent to about 1 part by weight water and about 15 parts by weight organic solvent to about 1 part by weight water, and preferably is present with respect to the water in a ratio between about 3 parts by weight organic solvent to about 1 part by weight water and about 10 parts by weight organic solvent to about 1 part by weight water, although the organic-to-water ratio can be outside of this range.

Examples of suitable water soluble dyes for the process of the present invention include anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Levafix Brilliant Red EGBA, available from Bayer; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, NY; Pontamine Brilliant Bond Blue; Berncolor A.Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Company (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF LP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), Procion Turquoise H7g (available from ICI Americas, Inc.), and the like, as well as mixtures thereof. Also suitable are dyes that are colorless but detectable when exposed to radiation at a wavelength outside the visible range, such as ultraviolet light or infrared light. In addition, dyes that are detectable when exposed to radiation at a wavelength outside the visible range, such as ultraviolet light or infrared light, but are not colorless may be used at a concentration such that they cannot be detected by the naked eye but are still detectable by fluorescence, infrared exposure, or the like. Examples of suitable fluorescent dyes include dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid of the formula wherein R is an aromatic amine, an aliphatic amine, a hydroxyl group, an alkoxy group, an aryloxy group, a halogen atom, an aminoalcohol group, a sulfonated aromatic amine, or the like, R' is an aromatic amine, an aliphatic amine, a hydroxy group, an alkoxy group, an aryloxy group, a halogen atom, an aminoalcohol group, a sulfonated aromatic amine, or the like, M is hydrogen, a lithium ion, a sodium ion, a potassium ion, a cesium ion, a rubidium ion, an ammonium ion, or the like, and wherein the ratio of sulfonic acid functional group to stilbene moiety typically varies from about 1:1 to about 6:1, although the ratio can be outside of this range; unsymmetrical triazinyl derivatives of 4,4'-diaminostilbene-2,2'-disulfonic acid; amide derivatives of 4,4'-diaminostilbene-2,2'-disulfonic acid of the formula wherein R is alkoxy, alkyl, phenyl, hydrogen, acetyl, alkylamido, and the like, R' is hydrogen, alkyl, alkoxy, phenyl, acetyl, alkylamido, and the like, M is hydrogen, a lithium ion, a sodium ion, a potassium ion, a cesium ion, a rubidium ion, an ammonium ion, or the like, and wherein the ratio of sulfonic acid group to aminostilbene typically is from about 2:1 to about 4:1, although the ratio can be outside of this range; phenylurea derivatives of 4,4'-disubstituted stilbene-2,2'-disulfonic acid of the formula wherein R is alkoxy, alkyl, phenyl, hydrogen, acetyl, alkylamido, and the like, R' is hydrogen, alkyl, alkoxy, phenyl, acetyl, alkylamido, and the like, M is hydrogen, a lithium ion, a sodium ion, a potassium ion, a cesium ion, a rubidium ion, an ammonium ion, or the like, and the ratio of sulfonic acid group to aminostilbene typically is from about 2:1 to about 4:1, although the ratio can be outside of this range; mono- or di-naphthyltriazole derivatives of 4,4'-disubstituted stilbene disulfonic acid of the formula wherein R is hydrogen or $SO_3R'$, wherein R' is hydrogen, a lithium ion, a sodium ion, a potassium ion, a cesium ion, a rubidium ion, an ammonium ion, or the like, and wherein the ratio of sulfonic acid group to aminostilbene is typically from about 2:1 to about 4:1, although the ratio can be outside of this range; derivatives of benzithiazole; derivatives of benzoxazole; derivatives of benziminazole; derivatives of coumarin; derivatives of pyrazolines containing sulfonic acid groups; 4,4'-bis(triazin-2-ylamino)stilbene-2,2'-disulfonic acids; 2-(stilben-4-yl)naphthotriazoles; 2-(4-phenylstilben-4-yl)benzoxazoles; 4,4-bis(triazo-2-yl)stilbene-2,2'-disulfonic acids; 1,4-bis(styryl)biphenyls; 1,3-diphenyl-2-pyrazolines; bis(benzazol-2-yl) derivatives; 3-phenyl-7-(triazin-2-yl)coumarins; carbostyrils; naphthalimides; 3,7-diaminodibenzothiophen-2,8-disulfonic acid 5,5-dioxide; 5-(E)-styreyl-1,3-dimethyluracil; pyrenebutyric acid; sodium pyrene-tetrasulfonate; 3-indole acetic acid; pyranine, available from Eastman Kodak Chemicals; 8-anilino-1-naphthyl sulfonic acid; 1-methyl-8-oxyquinolium betain; other commercially available materials, such as C.I. Fluorescent Brightener No. 28 (C.I. 40622), the fluorescent series Leucophor B-302, BMB (C.I. 290), BCR, BS, and the like (available from Leucophor); fluorescent brighteners as shown in the Colour Index, volume 2, 3rd edition, (society of Dyers and Colourists); and the like Additional examples of suitable chromophores that absorb in the infrared region include commercially available materials such as the Pro-Jet IR series of materials, available from ICI Fine Chemicals Division, as well as other infrared absorbing materials available from, for example, Eastman Kodak Company, Rochester, NY and Lambda Physics Inc., Bedford, MA.

Also suitable are the following infrared-sensitive dye structures:

wherein R can be any of the following groups:

and wherein X is any suitable anion, such as halide, including fluoride, chloride, bromide, and iodide, perhalates such as $ClO_4$, paratoluene sulfonate, organic acid ions, or the like.

The dye is added to the water-in-oil emulsion in any effective amount; typically, the dye is present in an amount such that from about 0.5 to about 30 percent by weight of the water phase comprises the dye, and preferably is present in an amount such that from about 5 to about 20 percent by weight of the water phase comprises the dye, although the amount can be outside of this range.

Examples of suitable surfactants for the process of the present invention include cationic, anionic, and nonionic types. Suitable anionic surfactants include alkyl sulfates of general structure $R^1OSO_3$ M, wherein $R^1$ is n-hexyl, n-heptyl, n-octyl, n-nonyl, n-decyl, n-undecyl, or n-dodecyl, and M is a +1 cation, such as for example a sodium or potassium cation or an ammonium cation, alkyl sulfonates of the general structure $R^1SO_3M$, wherein $R^1$ is n-hexyl, n-heptyl, n-octyl, n-nonyl, n-decyl, n-undecyl, or n-dodecyl, and M is a cation, such as for example a sodium or potassium cation, aryl sulfates of general structure $Ar^1OSO_3M$, wherein $Ar^1$ is an alkyl substituted phenyl group with the alkyl group being selected from the group consisting of n-hexyl, n-heptyl, n-octyl, n-nonyl, n-decyl, n-undecyl, and n-dodecyl, and M is a +1 cation, such as for example a sodium or potassium cation or an ammonium cation, aryl sulfonates of the general structure $Ar^1SO_4M$, wherein $Ar^1$ is an alkyl substituted phenyl group with the alkyl group being selected from the group consisting of n-hexyl, n-heptyl, n-octyl, n-nonyl, n-decyl, n-undecyl, and n-dodecyl, and M is a +1 cation, such as for example a sodium or potassium cation or an ammonium cation, dialkylsulfates of general structure $R^3COOCH_2CH(SO_4M)$—OOC—$R^3$, wherein $R^3$ is n-butyl, n-pentyl, n-hexyl, n-heptyl, or n-octyl, and M is a +1 cation, such as for example a sodium or potassium cation or an ammonium cation, dialkylsulfates of general formula $R^3OCH_2CH(SO_4M)CH_2OR^3$, wherein $R^3$ is n-butyl, n-pentyl, n-hexyl, n-heptyl, or n-octyl and M is a +1 cation, such as for example a sodium or potassium cation or an ammonium cation, trialkyl sulfates of the general structure:

wherein $R^5$, $R^6$, and $R^7$ are each selected from the group consisting of n-alkyl groups with from about 6 to about 18 carbon atoms, such as n-hexyl, n-octyl, n-nonyl, n-decyl, n-undecyl, n-dodecyl, n-tetradecyl, n-hexadecyl, or n-octadecyl, and M is a +1 cation, such as for example a sodium or potassium cation or an ammonium cation, and the like. Suitable cationic surfactants include alkylammonium salts of general structure $R^2N^+(CH_3)_2X^-$, wherein $R^2$ is an n-alkyl group with from about 6 to about 18 carbon atoms, such as n-hexyl, n-octyl, n-nonyl, n-decyl, n-undecyl, n-dodecyl, n-tetradecyl, n-hexadecyl, or n-octadecyl, and $X^-$ is a halogen anion such as a chloro or bromo anion, alkylammonium salts of general formula $R^2NH_2^+X^-$, wherein $R^2$ is an n-alkyl group with from about 6 to about 18 carbon atoms, such as n-hexyl, n-octyl, n-nonyl, n-decyl, n-undecyl, n-dodecyl, n-tetradecyl, n-hexadecyl, or n-octadecyl, and $X^-$ is a halogen anion such as a chloro or bromo anion, alkyl pyridinium salts of the general formula $Ar^2+X^-$, wherein $Ar^2$ is an alkyl substituted pyridinium group with the alkyl group being selected from the group consisting of n-alkyl groups with from about 6 to about 18 carbon atoms, such as n-hexyl, n-octyl, n-nonyl, n-decyl, n-undecyl, n-dodecyl, n-tetradecyl, n-hexadecyl, or n-octadecyl, and $X^-$ is a halogen anion such as a chloro or bromo anion, dialkylammonium salts of the general structure $(R^2)_2(CH_3)_2N^+X^-$, wherein $R^2$ is an n-alkyl group with from about 6 to about 18 carbon atoms, such as n-hexyl, n-octyl, n-nonyl, n-decyl, n-undecyl, n-dodecyl, n-tetradecyl, n-hexadecyl, or n-octadecyl, and $X^-$ is a halogen anion such as a chloro or bromo anion, dialkylammonium salts of general formula $(R^2)_2H_2N^+X^-$, wherein $R^2$ is an n-alkyl group with from about 6 to about 18 carbon atoms, such as n-hexyl, n-octyl, n-nonyl, n-decyl, n-undecyl, n-dodecyl, n-tetradecyl, n-hexadecyl, or n-octadecyl, and $X^-$ is a halogen anion such as a chloro or bromo anion, and the like. Suitable neutral surfactants include compounds of the general formula $Ar^3$—O—$(CH_2CH_2O)_nH$, wherein $Ar^3$ is an alkyl substituted phenyl group, the alkyl group belonging to the group consisting of n-alkyl groups with from about 6 to about 18 carbon atoms and branched alkyl groups such as 1,1,3,3-tetramethylbutyl, and n is a number ranging from one to about 20, $R^4O$—$(CH_2CH_2O)_nH$, wherein $R^4$ is an alkyl substituted cyclohexyl group, with the alkyl group being selected from the group consisting of n-alkyl groups with from about 6 to about 18 carbon atoms, such as n-hexyl, n-octyl, n-nonyl, n-decyl, n-undecyl, n-dodecyl, n-tetradecyl, n-hexadecyl, or n-octadecyl, or branched alkyl groups such as 1,1,3,3-tetramethylbutyl, and n is a number ranging from one to about 20, $R^2CO$—O—$(CH_2CH_2O)_nH$, wherein $R^2$ is an n-alkyl group with from about 6 to about 18 carbon atoms, such as n-hexyl, n-octyl, n-nonyl, n-decyl, n-undecyl, n-dodecyl, n-tetradecyl, n-hexadecyl, or n-octadecyl and n is a number ranging from one to about 20, glucosides of general structure $R^2$—G, wherein $R^2$ is an n-alkyl group with from about 6 to about 18 carbon atoms, such as n-hexyl, n-octyl, n-nonyl, n-decyl, n-undecyl, n-dodecyl, n-tetradecyl, n-hexadecyl, or n-octadecyl and G is a glucopyranoside substituted at the anomeric position with an alkoxy group of general structure $OR^2$, thioglucosides of the general structure $R^2$—SG, wherein $R^2$ is an n-alkyl group with from about 6 to about 18 carbon atoms, such as n-hexyl, n-octyl, n-nonyl, n-decyl, n-undecyl, n-dodecyl, n-tetradecyl, n-hexadecyl, or n-octadecyl, and SG is a thioglucopyranoside substituted at the anomeric position with an alkyl thio group of general structure $SR^2$, and the like. Specific examples of suitable commercial surfactants include those belonging to the Triton series available from Rohm and Haas Company, those belonging to the Tergitol series available from Union Carbide Corporation, those belonging to the Teepol series available from Shell Chemical Company, and the like. The surfactant is added to the water-in-oil emulsion in any effective amount; typically, the surfactant is present in an amount such that from about 5 to about 40 percent by weight of the oil phase comprises the surfactant, and preferably is present in an amount such that from about 15 to about 30 percent by weight of the oil phase comprises the surfactant, although the amount can be outside of this range. The surfactant is also selected for compatibility with any material in which the colorant particles of the present invention will be dispersed; for example, when the colorant particles are to be dispersed in a polymer resin to form electrostatic toner particles, the surfactant is selected so that it is compatible with the desired toner resin.

Examples of suitable tetraalkoxysilanes for the process of the present invention include those with from 1 to about 6 carbon atoms in the alkyl portion, such as tetramethoxysilane, tetraethoxysilane, tetra-n-propoxysilane, tetra-i-propoxysilane, tetra-n-butoxysilane, tetra-s-butoxysilane, tetra-i-butoxysilane, tetrapentoxysilane, tetrakis-(2-methoxyethoxysilane), and the like. The tetraalkoxysilane is added to the water-in-oil emulsion in any effective mount; typically, the tetraalkoxysilane is present in an amount such that from about 1 to about 30 percent by weight of the water phase comprises the tetraalkoxysilane, and preferably is present in an amount such that from about 5 to about 15 percent by weight of the water phase comprises the tetraalkoxysilane, although the amount can be outside of this range.

Examples of suitable reagents for hydrolyzing the tetraalkoxysilane for the process of the present invention include water-soluble bases such as ammonium hydroxide, sodium hydroxide, potassium hydroxide, and the like, and organic amines such as methyl amine, ethyl amine, propyl amine, or the like. The hydrolyzing reagent is added to the water-in-oil emulsion in any effective amount; typically, the hydrolyzing reagent is present in an amount such that from about 10 to about 60 percent by weight of the water phase comprises the hydrolyzing agent, and preferably is present in an amount such that from about 20 to about 40 percent by weight of the water phase comprises the hydrolyzing agent, although the amount can be outside of this range.

The colored particles of the present invention can be prepared by first mixing together the surfactant and the organic solvent (oil phase). followed by adding to the mixture a solution of the dye and the hydrolyzing agent in water and stirring until a stable microemulsion is formed. The microemulsion can be formed by stirring or gently shaking the solution at room temperature, although the solution can also be heated or cooled if desired. The microemulsion has completed formation when turbidity disappears from the solution and the solution appears to contain a single phase; the emulsion is microscopic and not visible to the unaided eye. Subsequent to formation of the microemulsion, the tetraalkoxysilane is added, preferably dropwise, and the microemulsion is stirred until the reaction is complete. The reaction can take place at room temperature, although the microemulsion can also be heated or cooled if desired. The reaction time depends on reaction conditions such as temperature, and typically ranges from about 4 hours to about 3 days, although the time can be outside of this range. Upon completion of the reaction, the colored particles thus formed are recovered from the solution. Recovery can be by any suitable means, such as by adding to the microemulsion a solvent that breaks up the microemulsion, such as acetone, propanone, methanol, ethanol, ethyl acetate, butyl acetate, methyl cellosolve, ethyl cellosolve, or the like, followed by filtering out the particles that precipitate from the solution and washing and drying the particles. The colored particles can also be recovered by evaporating the solvent to leave the particles as a solid residue, by spray drying, or the like.

Alternatively, the colored particles of the present invention can be prepared by first mixing together the surfactant and the organic solvent (oil phase), followed by adding to the mixture a solution of the hydrolyzing agent in water and stirring until a stable microemulsion is formed. The microemulsion can be formed by stirring or gently shaking the solution at room temperature, although the solution can also be heated or cooled if desired. The microemulsion has completed formation when turbidity disappears from the solution and the solution appears to contain a single phase; the emulsion is microscopic and not visible to the unaided eye. Subsequent to formation of the microemulsion a solution of the dye in water is added portionwise while stirring or shaking. To the resulting deeply colored microemulsion the tetraalkoxysilane is added, preferably dropwise, and the microemulsion is stirred until the reaction is complete. The reaction can take place at room temperature, although the microemulsion can also be heated or cooled if desired. The reaction time depends on reaction conditions such as temperature, and typically ranges from about 4 hours to about 3 days, although the time can be outside of this range. Upon completion of the reaction, the colored particles thus formed are recovered from the solution. Recovery can be by any suitable means, such as by adding to the microemulsion a solvent that breaks up the microemulsion, such as acetone, propanone, methanol, ethanol, ethyl acetate, butyl acetate, methyl cellosolve, ethyl cellosolve, or the like, followed by filtering out the particles that precipitate from the solution and washing and drying the particles. The colored particles can also be recovered by evaporating the solvent to leave the particles as a solid residue, by spray drying, fluidized bed, or the like.

Colored particles of the present invention typically have an average particle diameter of from about 10 to about 500 nanometers, and preferably from about 20 to about 200 nanometers, although the average particle diameter can be outside this range. Particle size can be controlled by the ratio of oil to water employed in the microemulsion; other ingredients in the microemulsion, such as a cosurfactant or cosolvent, can also be present to control drop size provided that they do not inhibit the reaction. Examples of cosolvents include alkyl alcohols, such as methanol, ethanol, n-propanol, n-butanol, n-pentanol, n-hexanol, n-heptanol, or n-octanol, 2-methyl-2-hexanol, and cyclohexanol, alkenols, such as 9-decenol, aryl alcohols, such as 3-phenylpropanol, diols, such as 3-phenoxy-1,2-propanediol, and the like. Mixtures of two or more surfactants may be used as long as they satisfy the requirements necessary for microemulsion formation as described, for example, by J. M. Williams, *Langmuir*, vol. 7, pages 1370–1377 (1991), the disclosure of which is totally incorporated herein by reference, and references cited therein. Typically, the particles comprise silica in an amount of from about 20 to about 80 percent by weight, dye in an amount of from about 1 to about 50 percent by weight, and surfactant in an amount of from about 5 to about 30 percent by weight, although the amounts can be outside these ranges.

The present invention also includes toner compositions comprising a resin and colorant particles which comprise silica particles containing a water soluble dye entrapped therein, said silica particles being coated with a surfactant.

Examples of suitable toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butyl acrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidene; styrene butadienes; mixtures of these monomers; and the like. The resin is present in the toner in any effective amount; typically, the resin is present in an amount of from about 30 to about 99 percent by weight of the toner composition, although the amount can be outside this range.

The colored particles of the present invention are present in the toner in any effective amount to achieve the desired hue and color intensity. Typically, the colored particles are present in the toner in an amount of from about 1 to about 20 percent by weight of the toner, and preferably from about 2 to about 8 percent by weight of the toner, although the amount can be outside this range.

Toners of the present invention can also contain charge control additives to obtain the desired triboelectric charging characteristics. Examples of suitable charge control additives include cetyl pyridinium chloride, distearyl dimethyl ammonium methyl sulfate, and the like. Additional examples of suitable charge control additives are disclosed in U.S. Pat. No. 4,560,635 and U.S. Pat. No. 4,294,904, the disclosures of each of which are totally incorporated herein by reference. The charge control agent is present in the toner in any effective amount, typically from about 0.1 to about 4 percent by weight, and preferably from about 0.5 to about 1 percent by weight, although the amount can be outside this range.

The toner compositions of the present invention can be prepared by any suitable method. For example, a method known as spray drying entails dissolving the toner resin in an organic solvent, such as toluene or chloroform, or a suitable solvent mixture. The toner colorant is also added to the solvent. Vigorous agitation, such as that obtained by ball milling processes, assists in assuring good dispersion of the colorant. The solution is then pumped through an atomizing nozzle while using an inert gas, such as nitrogen, as the atomizing agent. The solvent evaporates during atomization, resulting in toner particles of a colored resin, which are then attrited and classified by particle size. Particle diameter of the resulting toner varies, depending on the size of the nozzle, and generally varies between about 0.1 and about 100 microns.

Another suitable process is known as the Banbury method, a batch process wherein the dry toner ingredients are pre-blended and added to a Banbury mixer and mixed, at which point melting of the materials occurs from the heat energy generated by the mixing process. The mixture is then dropped into heated rollers and forced through a nip, which results in further shear mixing to form a large thin sheet of the toner material. This material is then reduced to pellet form and further reduced in size by grinding or jetting, after which the particles are classified by size. A third suitable toner preparation process, extrusion, is a continuous process that entails dry blending the toner ingredients, placing them into an extruder, melting and mixing the mixture, extruding the material, and reducing the extruded material to pellet form. The pellets are further reduced in size by grinding or jetting, and are then classified by particle size. Dry toner particles for two-component developers generally have an average particle size between about 6 micrometers and about 20 micrometers. Other similar blending methods may also be used. Subsequent to size classification of the toner particles, any external additives are blended with the toner particles. For two-component developers, the resulting toner composition is then mixed with carrier particles in any effective amounts; typically, the toner is present in an amount of from about 1 to about 5 parts by weight and the carrier is present in an amount of from about 95 to about 99 parts by weight, although the relative amounts of toner and carrier can be outside this range.

Colored particles of the present invention can also be used as colorants in microencapsulated toners. Toners of this type can be made by using the colored particles of the present invention as pigment particles and employing any of several known processes for making microencapsulated toners, such as the processes disclosed in U.S. Pat. No. 4,565,764, U.S. Pat. No. 4,520,091, U.S. Pat. No. 4,708,924, U.S. Pat. No. 4,254,201, U.S. Pat. No. 4,702,988, U.S. Pat. No. 4,766,051, U.S. Pat. No. 4,727,011, U.S. Pat. No. 4,725,522, and U.S. Pat. No. 4,937,167, the disclosures of each of which are totally incorporated herein by reference.

Any suitable external additives can also be utilized with the dry toner particles. The amounts of external additives are measured in terms of percentage by weight of the toner composition, but are not themselves included when calculating the percentage composition of the toner. For example, a toner composition containing a resin, a colorant, and an external additive can comprise 80 percent by weight of resin and 20 percent by weight of colored particles; the amount of external additive present is reported in terms of its percent by weight of the combined resin and colorant. External additives can include any additives suitable for use in electrostatographic toners, including straight silica, colloidal silica (e.g. Aerosil R972 ®, available from Degussa, Inc.), ferric oxide, Unilin, polypropylene waxes, polymethylmethacrylate, zinc stearate, chromium oxide, aluminum oxide, stearic acid, polyvinylidene fluoride (e.g. Kynar ®, available from Pennwalt Chemicals Corporation), and the like. External additives can be present in any effective amount; typically, external additives are present in amounts of from about 0.1 to about 3.0 percent by weight of the toner, although the amount can be outside this range.

The present invention also includes developer compositions which comprise mixtures of the toner of the present invention and carrier particles. Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process. Carrier particles can possess coated surfaces. Typical coating materials include polymers and terpolymers, including polymethylmethacrylate, fluoropolymers such as polyvinylidene fluorides as disclosed in U.S. Pat. No. 3,526,533, U.S. Pat. No. 3,849,186, and U.S. Pat. No. 3,942,979, the disclosures of each of which are totally incorporated herein by reference, and the like.

Typical dry toners are disclosed in, for example, U.S. Pat. No. 2,788,288, U.S. Pat. No. 3,079,342, and U.S. Pat. No. Re. 25,136, the disclosures of each of which are totally incorporated herein by reference.

The colored particles of the present invention can also be used as colorants in liquid electrostatic developers suitable for developing electrostatic latent images. Such compositions typically comprise nonaqueous dispersions of colored toner particles dispersed in a suitable liquid medium, and a charge control agent. Typical liquid media are colorless, odorless, nontoxic and non-flammable, having flash points greater than 104° F., and include aliphatic hydrocarbons. The liquid medium typically may be any of several hydrocarbon liquids conventionally employed for liquid development processes, such as hydrocarbons, including high purity alkanes having from about 7 to about 18 carbon atoms, such as Norpar ® 12, Norpar ® 13, and Norpar ® 15, available from Exxon Corporation, and including isoparaffinic hydrocarbons such as Isopar ® G, H, L, and M, available from Exxon Corporation, Amsco ® 460 Solvent, Amsco ® OMS, available from American Mineral Spirits Company, Soltrol ®, available from Phillips Petroleum Company, Pagasol ®, available from Mobil Oil Corporation, Shellsol ®, available from Shell Oil Company, and the like. Isoparaffinic hydrocarbons are preferred liquid media, since they are colorless, environmentally safe, and possess a sufficiently high vapor pressure so that a thin film of the liquid evaporates from the contacting surface within seconds at ambient temperatures. Particularly preferred are Isopar ® G and Isopar ® L. Generally, the liquid medium is present in a large amount in the developer composition, and constitutes that percentage by weight of the developer not accounted for by the other components. The liquid medium is present in an effective amount, generally from about 75 to about 99.4 percent by weight, although this amount may vary from this range provided that the objectives of the present invention are achieved.

The liquid developer preferably includes a charge control agent to give the colored silica particles charge in order for them to undergo electrophoresis in an electric field. Any suitable charge control agent selected from the well known agents for such purpose may be used. Useful charge control agents include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum dresinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive generally is present in an amount of from about 0.001 to about 2 percent by weight, and preferably from about 0.01 to about 0.8 percent by weight of the developer composition.

The colored toner particles can either consist of the colored particles of the present invention dispersed in the liquid medium or of particles comprising a resin and the colored particles of the present invention. When the toner particles consist solely of the colored particles of the present invention, the liquid developer typically also contains a polymeric material soluble in the liquid medium. By soluble, it is meant that the polymeric material can be dissolved in the liquid medium in amounts of at least about 5 to about 10 percent by weight at the operating temperature of the liquid developer during development and at those temperatures to which the developer will be exposed during shipment and storage. Preferably, the polymeric material is soluble in the liquid medium at temperatures of about $-20°$ C. or lower, and also soluble at temperatures of about 70° C. or higher, as well as being soluble between these temperatures. This temperature range of from about $-20°$ C. to about 70° C. represents the temperatures to which it can be expected that a liquid developer might be exposed during shipment or storage; the polymer may exhibit solubility in the liquid medium within a narrower or broader temperature range, provided that the objectives of the present invention are achieved. Examples of suitable polymers for this embodiment of the present invention include poly(2-ethyl hexylmethacrylate); poly(isobutylene-co-isoprenes), such as Kalene 800, available from Hardman Company N.J.; polyvinyl toluene-based copolymers, including vinyl toluene acrylic copolymers such as Pliolite OMS, available from the Goodyear Tire and Rubber Company; block copolymers such as poly(styrene-b-hydrogenated butadiene), including Kraton G 1701, available from Shell Chemical Company; and the like, as well as mixtures thereof. The polymer becomes adsorbed onto the surfaces of the colored silica particles in the liquid developer by dispersion forces, and functions as a stabilizer to maintain distance between the colored silica particles and prevent agglomeration and precipitation of the particles in the developer. Generally, the polymer is present in the liquid developer in an amount of from about 0.5 to about 15 percent by weight, and preferably from about 1 to about 5 percent by weight. This type of liquid developer generally can be prepared by heating and mixing the ingredients, followed by grinding the mixture in an attritor until homogeneity of the mixture has been achieved, generally for about one hour. Subsequently, the charge control agent is added to the mixture to yield the liquid developer. Subsequent to the preparation of this developer composition, the particles generally possess a charge to mass ratio of from about 50 to 2,000 microcoulombs per gram.

When the toner particles consist of a mixture of a resin and the colored particles of the present invention, the resin generally is insoluble in the liquid medium at ambient temperature (generally from about 20° to about 30° C.) and can be either soluble or insoluble but fluid in the liquid vehicle at temperatures of from about 70° to about 120° C. Examples of suitable resins that are insoluble in the liquid vehicle at elevated temperatures include copolymers of ethylene and methacrylic acid or acrylic acid, such as Elvax II 5550, Elvax II 5610, Elvax II 5750T, Elvax II-5720, available from E.I. DuPont, copolymers of ethylene and vinyl acetate, such as those available as the Elvax ® resins from E.I. Du Pont de Nemours & Company, including Elvax I 420, Elvax I, Elvax I 310, Elvax I 210, Elvax I-250, methacrylate copolymers, such as Elvacite 2014, Elvacite 2013, Elvacite 2016, and Elvacite 2028 resins, available from E.I. Du Pont, and the like, as well as mixtures thereof. Suitable resins that are soluble in the liquid vehicle at elevated temperatures but insoluble at ambient temperature include polyolefins and halogenated polyolefins, including poly-α-olefins and chlorinated polypropylenes. Examples of suitable polyolefins include chlorinated polypropylene, such as that available from Eastman Kodak Company as CP-343-1, poly-α-olefins, such as polyhexadecene, including those of the general formula $(C_{16}H_{32})_x$, wherein x is a number of from about 250 to about 21,000, the number average molecular weight is from about 17,500 to about 1,500,000 as determined by GPC, and the $M_w/M_n$ dispersibility ratio is from about 2 to about 15, polyoctadecene, including those of the general formula $(C_{18}H_{36})_x$, wherein x is a number of from about 250 to about 21,000, the number average molecular weight is from about 17,500 to about 1,500,000 as determined by GPC, and the $M_w/M_n$ dispersibility ratio is from about 2 to about 15, and the like. Polyhexadecenes and polyoctadecenes suitable as resins for the liquid developers of the present invention may be prepared by, for example, the methods set forth in U. Giannini, G. Bruckner, E. Pellino, and A. Cassatta, *Journal of Polymer Science*, Part C (22), pages 157 to 175 (1968), and in K. J. Clark, A. Turner Jones, and D. G. H. Sandiford, *Chemistry in Industry*, pages 2010 to 2012 (1962), the disclosures of each of these articles being totally incorporated herein by reference. Liquid developers of this embodiment of the present invention generally can be prepared by mixing the resin particles and the liquid medium, for example in an attritor such as a Union Process 01 Attritor, available from Union Process Inc., Akron, Ohio, with heating at a temperature at or above the melting point of the resin, generally from about 80° to about 130° C., causing the resin to melt and form a resin/liquid medium mixture wherein the liquid medium functions as a diluent for the resin and lowers its viscosity. The liquid medium and resin generally are mixed for a period of from about 30 minutes to about 2 hours. Generally, the liquid medium is present in the mixture in an amount of from about 80 percent by weight to about 90 percent by weight, and preferably is present in a amount of from about 82 to about 94 percent by weight. Subsequently, the colored particles of the present invention are added to the resin/liquid medium mixture at a temperature of from about 80° to about 130° C. in an amount of from about 5 to about 35 percent by weight of the resin, and preferably in an amount of from about 10 to 25 percent by weight of the resin. After dispersion of the colored particles in the molten resin, the mixture obtained is cooled to ambient temperature over a period, for example, of from about 1 to about 6 hours, resulting in formation of toner particles with an average particle diameter of from about 1 to about 6 microns, wherein the resin has absorbed onto the surfaces of the colored particles. The concentrated dispersion is then diluted with an additional amount of the liquid medium to form the liquid developer composition. Generally, the concentration of the toner particles in the hydrocarbon is from about 0.4 percent by weight to about 6 percent by weight and preferably from about 0.8 percent to about 2.0 percent by weight. Thereafter, a charge control agent is added to the dispersion formed to enable an electrophoretic liquid developer composition. The final developer generally comprises the liquid medium in an amount of from about 94 to about 99.6 percent by weight, preferably from about 97 to about 99.5 percent by weight, the toner particles in an amount of from about 0.4 to about 6 percent by weight, and preferably from about 0.8 to about 2.0 percent by weight, and the charge control agent in an amount of from about 0.01 to about 0.2 percent by weight, preferably from about 0.02 to about 0.2 percent by weight. Within the toner particles, the resin is generally present in an amount of from about 65 to about 95 percent by weight, and preferably from about 75 to about 90 percent by weight, and the colored particles are present in an amount of from about 5 to about 35 percent by weight, and preferably from about 10 to about 25 percent by weight. Generally, the charge to mass ratio of the toner particles in the developer is from about 50 to about 150 microcoulombs per gram, and preferably from about 70 to about 130 microcoulombs per gram.

The colored particles of the present invention can also be employed as colorants in applications such as hot melt ink jet inks. Ink jet printing processes can employ inks that are solid at room temperature and liquid at elevated temperatures. For example, U.S. Pat. No. 4,490,731, the disclosure of which is totally incorporated herein by reference, discloses an apparatus for dispensing solid ink for printing on a substrate such as paper. The ink dye vehicle is chosen to have a melting point above room temperature, so that the ink which is melted in the apparatus will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by the heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. Advantages of a hot melt ink in ink jet printing are elimination of potential spillage of the ink during handling, a wide range of print density and quality, minimal paper cockle or distortion, and enablement of indefinite periods of nonprinting without the danger of nozzle clogging, even without capping the nozzles. In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen. Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

Hot melt ink jet inks typically comprise a binder material, a colorant, and a propellant. In some instances, the propellant can also function as the binder. Examples of suitable binders and propellants and processes for making hot melt ink jet inks are disclosed in, for example, U.S. Pat. No. 5,006,170, the disclosure of which is totally incorporated herein by reference.

The colored particles of the present invention can also be used to provide color to other organic-based materials, such as oil-based inks for pens or other writing implements, plastics, or the like.

The present invention also includes a process for forming images which comprises (1) forming an electrostatic latent image on an imaging member; (2) developing the latent image with a toner comprising a resin and colorant particles which comprise silica particles containing a water soluble dye entrapped therein, said silica particles being coated with a surfactant; and (3) transferring the developed image to a substrate. Optionally, the transferred image can be permanently affixed to the substrate by any suitable means. The deposited toner image is transferred to a substrate such as paper, transparency material, or the like. Transfer can be enhanced by applying an electrostatic charge to the rear surface of the substrate by a charging means such as a corona device. The deposited toner image can be transferred to the substrate by any suitable technique, such as corona transfer, pressure transfer, adhesive transfer, bias roll transfer, and the like. Typical corona transfer entails contacting the deposited toner particles with a sheet of paper and applying an electrostatic charge on the side of the sheet opposite to the toner particles. A single wire corotron having applied thereto a potential of between about 5000 and about 8000 volts provides satisfactory transfer. After transfer, the transferred toner image can be fixed to the receiving sheet. Typical well known fusing techniques include heated roll fusing, flash fusing, oven fusing, cold pressure fusing, laminating, adhesive spray fixing, and the like.

The colored particles of the present invention enable many advantages. For example, the colored particles can be made in a wide variety of colors, since water soluble dyes in many colors are commercially available. In addition, custom colors, such as those for a particular company's logo, can be formulated by mixing two or more dyes together to obtain the desired color prior to enclosing the dye mixture in the silica particles. Further, since particles of different colors are made by the same process and have the same surface characteristics, the particles of the present invention enable preparation of toners of different colors and similar triboelectric charging characteristics. Preparation of a series of electrostatic toners of similar triboelectric characteristics and different colors is often desirable for applications wherein toners of different colors are to be used in the same machine. Since the toners all have identical compositions and triboelectric characteristics, the machine need not be adjusted for the different toners, copy quality remains consistent for different colors, and cross-contamination (for example, contamination of one toner with the charge control additive contained in another) is reduced or eliminated. The presence of the surfactant on the particle surfaces also enhances the dispersibility of the colored particles in resins such as those used in electrostatic toners. A highly uniform dispersion of the colorant particles in the toner resin is desirable because colorant particles that become agglomerated together in the resin impart less intense color to the resin, and a higher concentration of colorant is required to obtain the desired color. In addition, the agglomeration of particles into larger particles or the close proximity of particles to each other (wherein the distance between the particles is less than the wavelength of light applied to the material containing the particles), light wavelength scattering is affected so that the color appears muddy; in contrast, a uniform dispersion of small particles in the toner resin renders the toner transparent with clear colors. In addition, since the colored particles are quite small, typically from about 10 to about 500 nanometers in average diameter, electrostatic toners containing the colored particles as colorants can be used to make images on overhead transparencies; the small particle size reduces light scattering and enables formation of transparent images that project substantially the same color as the toner on the transparency sheet. Further, the colored particles of the present invention can be prepared with dyes that are invisible to the naked eye under ordinary lighting conditions but that are detectable when exposed to wavelengths outside the visible range, such as infrared or ultraviolet. The dye detectable when exposed to wavelengths outside the visible range can be present instead of a visible dye, when colorless particles are desired, or in addition to a visible dye, when colored particles detectable under ultraviolet or infrared light are desired. In addition, a material can contain a mixture of both particles wherein the silica contains a visible dye and particles wherein the silica contains a dye colorless in the visible wavelength range and visible in another wavelength range. Marking materials containing colorants detectable when exposed to wavelengths outside the visible range are useful in several applications, such as security markings, identification of specific materials and their sources, and the like. Other examples of applications for these materials are disclosed in, for example, copending U.S. application Ser. No. 07/636,264, entitled "Method of Storing Information Within a Reproduction System", filed Dec. 31, 1990, with the named inventor Joseph D. Wright, the disclosure of which is totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Cyan Pigment

A solution of Procion Turquoise H7G cyan dye (1.5 grams, obtained from ICI Americas, Inc.), concentrated ammonium hydroxide (14.1 Molar, 20 milliliters), and water (10 milliliters) was added to a solution of Triton X-114 surfactant (40 grams, obtained from Rohm and Haas Company) in cyclohexane (150 milliliters). A thick gel formed immediately. The mixture was stirred at room temperature for 2 hours, after which tetraethoxysilane (6 milliliters, obtained from Aldrich Chemical Co.) was added dropwise over a period of 2 minutes. The reaction mixture was stirred overnight, after which it was poured into 300 milliliters of acetone, resulting in formation of a fine deeply cyan colored flocculate. The flocculate was separated by filtration, washed with acetone, and dried in vacuo at 30° C. for 24 hours to yield 3.2 grams of a deeply cyan colored solid. The particle size was 40 nanometers, as measured by transmission electron microscopy.

EXAMPLE II

Magenta Pigment

A solution of Levafix Brilliant Red E6BA dye (48.0 grams, obtained from Bayer), concentrated ammonium hydroxide (14.1 Molar, 160 milliliters), and water (80 milliliters) was added to a solution of Triton X-114 surfactant (240 grams, obtained from Rohm and Haas Company) in cyclohexane (1200 milliliters). A thick gel formed immediately. The mixture was stirred at room temperature for 2 hours, after which tetraethoxysilane (48 milliliters, obtained from Aldrich Chemical Co.) was added dropwise over a period of 2 minutes. The reaction mixture was stirred overnight, after which 500 milliliters of acetone were added, resulting in formation of a fine deeply magenta colored flocculate. The flocculate was separated by filtration, washed with acetone, and dried in vacuo at 50° C. for 24 hours to yield 25.4 grams of a deeply magenta colored solid. The particle size was 55 nanometers, as measured by transmission electron microscopy.

EXAMPLE III

Black Pigment

A solution of Basilen Black P-BR dye (27.3 grams, obtained from BASF), Reactive Orange 16 (20.7 grams, obtained from Aldrich Chemicals Corporation), concentrated ammonium hydroxide (14.1 Molar, 160 milliliters), and water (80 milliliters) was added to a solution of Triton X-114 surfactant (240 grams, obtained from Rohm and Haas Company) in cyclohexane (1200 milliliters). A thick gel formed immediately. The mixture was stirred at room temperature for 2 hours, after which tetraethoxysilane (48 milliliters, obtained from Aldrich Chemical Co.) was added dropwise over a period of 2 minutes. The reaction mixture was stirred overnight, after which 500 milliliters of acetone were added, resulting in formation of a fine deeply black colored flocculate. The flocculate was separated by filtration, washed with acetone, and dried in vacuo at 50° C. for 24 hours to yield 50.4 grams of a deeply black colored solid. The particle size was 70 nanometers, as measured by transmission electron microscopy.

EXAMPLE IV

Yellow Pigment

A solution of Reactive Yellow 86 dye (1.12 grams, obtained from Sigma Chemical Co.),, concentrated ammonium hydroxide (14.1 Molar, 3.7 milliliters), and water (80 milliliters) was added to a solution of Triton X-114 surfactant (5.6 grams, obtained from Rohm and Haas Company) in cyclohexane (28 milliliters). A thick gel formed immediately. The mixture was stirred at room temperature for 2 hours, after which tetraethoxysilane (6 milliliters, obtained from Aldrich Chemical Co.) was added dropwise over a period of 2 minutes. The reaction mixture was stirred overnight, after which 40 milliliters of acetone were added, resulting in formation of a fine deeply yellow colored flocculate. The flocculate was separated by filtration, washed with acetone, and dried in vacuo at 50° C. for 24 hours to yield 0.65 grams of a deeply yellow colored solid. The particle size was 40 nanometers, as measured by transmission electron microscopy.

EXAMPLE V

Black Pigment

A solution of Basilen Black P-BR dye (1.12 grams, obtained from BASF), concentrated ammonium hydroxide (14.1 Molar, 3.7 milliliters), and water (3.7 milliliters) was added to a solution of Triton X-45 surfactant (5.6 grams, obtained from Rohm and Haas Company) in cyclohexane (28 milliliters). A thick gel formed immediately. The mixture was stirred at room temperature for 2 hours, after which tetraethoxysilane (6 milliliters, obtained from Aldrich Chemical Co.) was added dropwise over a period of 2 minutes. The reaction mixture was stirred overnight, after which 50 milliliters of acetone were added, resulting in formation of a fine deeply black colored flocculate. The flocculate was separated by filtration, washed with acetone, and dried in vacuo at 50° C. for 24 hours to yield 0.82 grams of a deeply black colored solid. The particle size was 70 nanometers, as measured by transmission electron microscopy.

EXAMPLE VI

Cyan Pigment

A solution of Procion Turquoise HA GRNS dye (6.8 grams, obtained from ICI), concentrated ammonium hydroxide (14.1 Molar, 1.8 milliliters), and water (6.48 milliliters) was added to a solution of AOT surfactant (40 grams, dioctyl sulfosuccinate, sodium salt, obtained from Aldrich Chemical Co.) in toluene (200 milliliters). A thick gel formed immediately. The mixture was stirred at room temperature for 2 hours, after which tetraethoxysilane (6.8 milliliters, obtained from Aldrich Chemical Co.) was added dropwise over a period of 2 minutes. The reaction mixture was stirred overnight, after which 50 milliliters of acetone were added, resulting in formation of a fine deeply cyan colored flocculate. The flocculate was separated by filtration, washed with acetone, and dried in vacuo at 50° C. for 24 hours to yield 6.5 grams of a deeply cyan colored solid. The particle size was 15 nanometers, as measured by transmission electron microscopy.

EXAMPLE VII

Cyan Pigment

A solution of Procion Turquoise HA MX-G dye (5.6 grams, obtained from ICI), concentrated ammonium hydroxide (14.1 Molar, 18.5 milliliters), and water (9.3 milliliters) was added to a solution of Alkasurf NP-8 surfactant (28 grams, obtained from Alkaril Chemicals LTD) in cyclohexane (140 milliliters). A thick gel formed immediately. The mixture was stirred at room temperature for 2 hours, after which tetraethoxysilane (5.6 milliliters, obtained from Aldrich Chemical Co.) was added dropwise over a period of 2 minutes. The reaction mixture was stirred overnight, after which 50 milliliters of acetone were added, resulting in formation of a fine deeply cyan colored flocculate. The flocculate was separated by filtration, washed with acetone, and dried in vacuo at 50° C. for 24 hours to yield 5.9 grams of a deeply cyan colored solid. The particle size was 36 nanometers, as measured by transmission electron microscopy.

EXAMPLE VIII

Fluorescent Pigment

A solution of 4,4'-diaminostilbene-2,2'-disulfonic acid dye (1.5 grams, obtained from Eastman Kodak Chemicals), concentrated ammonium hydroxide (14.1 Molar, 2.3 milliliters), and water (8.1 milliliters) was added to a solution of Alkasurf OP-8 surfactant (42 grams, obtained from Alkaril Chemicals LTD) in cyclohexane (140 milliliters). A thick gel formed immediately. The mixture was stirred at room temperature for 2 hours, after which tetraethoxysilane (8.4 milliliters, obtained from Aldrich Chemical Co.) was added dropwise over a period of 2 minutes. The reaction mixture was stirred overnight, after which 50 milliliters of acetone were added, resulting in formation of a fine deeply white colored flocculate. The flocculate was separated by filtration, washed with acetone, and dried in vacuo at 50° C. for 24 hours to yield 5.9 grams of a slightly tan colored solid. The particle size was 45 nanometers, as measured by transmission electron microscopy. The powder exhibited a strong fluorescence centered at 475 nm, as measured with a fluorescence spectrometer from SPEX industries.

EXAMPLE IX

Fluorescent Pigment

A solution of dansyl-lysine dye (100 milligrams, obtained from Molecular Probes), concentrated ammonium hydroxide (14.1 Molar, 5.5 milliliters), and water (2.8 milliliters) was added to a solution of Triton X-45 surfactant (8.3 grams, obtained from Rohm and Haas) in cyclohexane (41.5 milliliters). A thick gel formed immediately. The mixture was stirred at 25° C. for 2 hours, after which tetraethoxysilane (1.67 milliliters, obtained from Aldrich Chemical Co.) was added dropwise over a period of 2 minutes. The reaction mixture was stirred at 25° C. overnight, after which 50 milliliters of acetone were added, resulting in formation of a fine white colored flocculate. The flocculate was separated by filtration, washed with acetone, and dried in vacuo at 50° C. for 24 hours to yield 0.53 grams of a white colored solid. The particle size was 35 nanometers, as measured by transmission electron microscopy. The powder exhibited a strong fluorescence centerd at 510 nm, as measured with a fluorescence spectrometer from SPEX industries.

EXAMPLE X

Fluorescent Pigment

A solution of dansyl-lysine dye (100 milligrams, obtained from Molecular Probes), concentrated ammonium hydroxide (14.1 Molar, 5.5 milliliters), and water (2.8 milliliters) was added to a solution of Triton X-45 surfactant (8.3 grams, obtained from Rohm and Haas) in cyclohexane (41.5 milliliters). A thick gel formed immediately. The mixture was stirred at 40° C. for 2 hours, after which tetraethoxysilane (1.67 milliliters, obtained from Aldrich Chemical Co.) was added dropwise over a period of 2 minutes. The reaction mixture was stirred at 40° C. overnight, after which 50 milliliters of acetone were added, resulting in formation of a fine white colored flocculate. The flocculate was separated by filtration, washed with acetone, and dried in vacuo at 50° C. for 24 hours to yield 0.48 grams of a white colored solid. The particle size was 44 nanometers, as measured by transmission electron microscopy. The powder exhibited a strong fluorescence centered at 510 nm, as measured with a fluorescence spectrometer from SPEX industries.

EXAMPLE XI

Magenta Toner

A mixture of a styrene/butadiene resin containing 89 percent by weight of styrene and 11 percent by weight of butadiene, commercially available from Goodyear Chemical Company as Pliolite (188 grams) and the magenta pigment described in Example II (12 grams) was dry-blended by shaking for 30 minutes. The mixture was then melt-blended in an extruder at a temperature of 120° C. for about 25 minutes. Mechanical attrition and subsequent classification in order to remove particles smaller than 5 microns in diameter resulted in a magenta toner having an average particle diameter of 7.9 microns with a GSD (geometric size distribution) of 1.26, as measured with a Coulter Counter.

EXAMPLE XII

MagentaToner

A mixture of a styrene/butadiene resin containing 89 percent by weight of styrene and 11 percent by weight of butadiene, commercially available from Goodyear Chemical Company as Pliolite (160 grams) and the magenta pigment described in Example II (40 grams) was dry-blended by shaking for 30 minutes. The mixture was then melt-blended in an extruder at a temperature of 120° C. for about 15 minutes. Mechanical attrition and subsequent classification in order to remove particles smaller than 5 microns in diameter resulted in a magenta toner having an average particle diameter of 9.2 microns with a GSD of 1.32, as measured with a Coulter Counter.

EXAMPLE XIII

BlackToner

A mixture of a styrene/butadiene resin containing 89 percent by weight of styrene and 11 percent by weight of butadiene, commercially available from Goodyear Chemical Company as Pliolite (48.75 grams) and the black pigment described in Example III (1.25 grams) was dry-blended by shaking for 30 minutes. The mixture was then melt-blended in an extruder at a temperature of 120° C. for about 30 minutes. Mechanical attrition and subsequent classification in order to remove particles smaller than 5 microns in diameter resulted in a magenta toner having an average particle diameter of 11.0 microns with a GSD of 1.29, as measured with a Coulter Counter.

EXAMPLE XIV

BlackToner

A mixture of a styrene/butadiene resin containing 89 percent by weight of styrene and 11 percent by weight of butadiene, commercially available from Goodyear Chemical Company as Pliolite (47.0 grams) and the black pigment described in Example III (3.0 grams) was dry-blended by shaking for 30 minutes. The mixture was then melt-blended in an extruder at a temperature of 120° C. for about 20 minutes. Mechanical attrition and subsequent classification in order to remove particles smaller than 5 microns in diameter resulted in a black toner having an average particle diameter of 12.2 microns with a GSD of 1.31, as measured with a Coulter Counter.

EXAMPLE XV

BlackToner

A mixture of a styrene/butadiene resin containing 89 percent by weight of styrene and 11 percent by weight of butadiene, commercially available from Goodyear Chemical Company as Pliolite (45.0 grams) and the black pigment described in Example III (5.0 grams) was dry-blended by shaking for 30 minutes. The mixture was then melt-blended in an extruder at a temperature of 120° C. for about 25 minutes. Mechanical attrition and subsequent classification in order to remove particles smaller than 5 microns in diameter resulted in a black toner having an average particle diameter of 12.4 microns with a GSD of 1.29, as measured with a Coulter Counter.

EXAMPLE XVI

CyanToner

A mixture of a styrene/butadiene resin containing 89 percent by weight of styrene and 11 percent by weight of butadiene, commercially available from Goodyear Chemical Company as Pliolite (58.5 grams) and the cyan pigment described in Example VI (1.5 grams) was dry-blended by shaking for 30 minutes. The mixture was then melt-blended in an extruder at a temperature of 120° C. for about 20 minutes. Mechanical attrition and subsequent classification in order to remove particles smaller than 5 microns in diameter resulted in a cyan toner having an average particle diameter of 10.2 microns with a GSD of 1.29, as measured with a Coulter Counter.

EXAMPLE XVII

CyanToner

A mixture of a styrene/butadiene resin containing 89 percent by weight of styrene and 11 percent by weight of butadiene, commercially available from Goodyear Chemical Company as Pliolite (56.4 grams) and the cyan pigment described in Example VI (3.6 grams) was dry-blended by shaking for 30 minutes. The mixture was then melt-blended in an extruder at a temperature of 120° C. for about 15 minutes. Mechanical attrition and subsequent classification in order to remove particles smaller than 5 microns in diameter resulted in a cyan toner having an average particle diameter of 11.1 microns with a GSD of 1.31, as measured with a Coulter Counter.

EXAMPLE XVII

CyanToner

A mixture of a styrene/butadiene resin containing 89 percent by weight of styrene and 11 percent by weight of butadiene, commercially available from Goodyear Chemical Company as Pliolite (4 grams) and the cyan pigment described in Example VI (6.0 grams) was dry-blended by shaking for 30 minutes. The mixture was then melt-blended in an extruder at a temperature of 120° C. for about 30 minutes. Mechanical attrition and subsequent classification in order to remove particles smaller than 5 microns in diameter resulted in a cyan toner having an average particle diameter of 12.2 microns with a GSD of 1.28, as measured with a Coulter Counter.

EXAMPLE XIX

YellowToner

A mixture of a styrene/butadiene resin containing 89 percent by weight of styrene and 11 percent by weight of butadiene, commercially available from Goodyear Chemical Company as Pliolite (4 grams) and the yellow pigment described in Example IV (6.0 grams) was dry-blended by shaking for 30 minutes. The mixture was then melt-blended in an extruder at a temperature of 120° C. for about 25 minutes. Mechanical attrition and subsequent classification in order to remove particles smaller than 5 microns in diameter resulted in a yellow toner having an average particle diameter of 11.4 microns with a GSD of 1.28, as measured with a Coulter Counter.

EXAMPLE XX

Magenta Developer

A developer composition was prepared by admixing for 15 minutes 1 gram of the toner prepared as described in Example XII with 49.0 grams of a carrier comprising 99.5 percent by weight of ferrite cores and 0.5 percent by weight of a methyl terpolymer carrier coating (the terpolymer comprising 80.9 percent by weight methyl methacrylate, 14 percent by weight styrene, and 5.1 percent by weight vinyltriethylsilane). There resulted on the toner composition a positive triboelectric charge of 8.6 microcoulomb per gram.

EXAMPLE XXI

Cyan Developer

A developer composition was prepared by admixing for 15 minutes 1 gram of the toner prepared as described in Example XVIII with 49.0 grams of a carrier comprising 98.7 percent by weight of non-round Toniolo core steel shots and 1.3 percent by weight of a carrier coating (comprising 92.5 percent by weight chlorotrifluoroethylene/vinyl chloride copolymer, obtained from Occidental Petroleum Company, and 7.5 percent by weight Regal 330 carbon black, obtained from Cabot Corporation). There resulted on the toner composition a negative triboelectric charge of 15.7 microcoulomb per gram.

EXAMPLE XXII

Black Developer

A developer composition was prepared by admixing for 15 minutes 1 gram of the toner prepared as described in Example XIV with 49.0 grams of a carrier comprising 98.7 percent by weight of non-round Toniolo core steel shots and 1.3 percent by weight of a carrier coating (comprising 92.5 percent by weight chlorotrifluoroethylene/vinyl chloride copolymer, obtained from Occidental Petroleum Company, and 7.5 percent by weight Regal 330 carbon black, obtained from Cabot Corporation). There resulted on the toner composition a negative triboelectric charge of 30.4 microcoulomb per gram.

EXAMPLE XXIII

Cyan Developer

A developer composition was prepared by admixing for 15 minutes 1 gram of the toner prepared as described in Example XVI with 49.0 grams of a carrier comprising 98.7 percent by weight of non-round Toniolo core steel shots and 1.3 percent by weight of a carrier coating (comprising 92.5 percent by weight chlorotrifluoroethylene/vinyl chloride copolymer, obtained from Occidental Petroleum Company, and 7.5 percent by weight Regal 330 carbon black, obtained from Cabot Corporation). There resulted on the toner composition a negative triboelectric charge of 23.3 microcoulomb per gram.

EXAMPLE XXIV

Magenta Developer

A developer composition was prepared by admixing for 15 minutes 1 gram of the toner prepared as described in Example XII with 49.0 grams of a carrier comprising 98.7 percent by weight of non-round Toniolo core steel shots and 1.3 percent by weight of a carrier coating (comprising 92.5 percent by weight chlorotrifluoroethylene/vinyl chloride copolymer, obtained from Occidental Petroleum Company, and 7.5 percent by weight Regal 330 carbon black, obtained from Cabot Corporation). There resulted on the toner composition a negative triboelectric charge of 19.8 microcoulomb per gram.

EXAMPLE XXV

Yellow Developer

A developer composition was prepared by admixing for 15 minutes 1 gram of the toner prepared as described in Example XIX with 49.0 grams of a carrier comprising 98.7 percent by weight of non-round Toniolo core steel shots and 1.3 percent by weight of a carrier coating (comprising 92.5 percent by weight chlorotrifluoroethylene/vinyl chloride copolymer, obtained from Occidental Petroleum Company, and 7.5 percent by weight Regal 330 carbon black, obtained from Cabot Corporation). There resulted on the toner composition a negative triboelectric charge of 24.5 microcoulomb per gram.

EXAMPLE XXVI

The developer compositions of Examples XX to XXV were used for developing images in a xerographic imaging test device employing the cascade development method. Solid image areas were fused with a modified Xerox ® 1075 apparatus equipped with a soft roll fuser set at 12.7 inches per second. Images of optical density ranging from 0.8 to 1.4 were obtained on Xerox ® 4024 paper, available from Xerox. Transparent images were obtained on Xerox ® #3R2780 transparencies.

Other embodiments and modifications of the present invention may occur to those skilled in the art subsequent to a review of the information presented herein; these embodiments and modifications, as well as equivalents thereof, are also included within the scope of this invention.

What is claimed is:

1. A composition which comprises silica particles containing a water soluble dye entrapped therein, said silica particles being coated with a surfactant.

2. A composition according to claim 1 wherein the particles have an average particle diameter of from about 10 to about 200 nanometers.

3. A composition according to claim 1 wherein the particles have an average particle diameter of from about 20 to about 200 nanometers.

4. A composition according to claim 1 wherein the dye is detectable when exposed to radiation outside the visible wavelength range.

5. A composition according to claim 1 wherein the particles comprise silica in an amount of from about 20 to about 80 percent by weight, dye in an amount of from about 1 to about 50 percent by weight, and surfactant in an amount of from about 5 to about 30 percent by weight.

6. A toner composition comprising a resin and silica particles containing a water soluble dye entrapped therein, said silica particles being coated with a surfactant.

7. A toner composition according to claim 6 wherein the particles have an average particle diameter of from about 10 to about 500 nanometers.

8. A toner composition according to claim 6 wherein the particles have an average particle diameter of from about 20 to about 200 nanometers.

9. A toner composition according to claim 6 wherein the dye is detectable when exposed to radiation outside the visible wavelength range.

10. A toner composition according to claim 6 wherein the particles comprise silica in an amount of from about 20 to about 80 percent by weight, dye in an amount of from about 1 to about 50 percent by weight, and surfactant in an amount of from about 5 to about 30 percent by weight.

11. A toner composition according to claim 6 also containing a charge control agent.

12. A toner composition according to claim 6 wherein the charge control agent is present in an amount of from 0.1 to about 4 percent by weight.

13. A developer composition comprising the toner of claim 6 and carrier particles.

14. A liquid developer composition comprising an organic liquid vehicle, a polymer soluble in the organic liquid vehicle, a charge control agent, and silica particles containing a water soluble dye entrapped therein, said silica particles being coated with a surfactant, wherein said silica particles are dispersed within the organic liquid vehicle.

15. A liquid developer composition comprising an organic liquid vehicle, a charge control agent, and toner particles comprising a resin insoluble in the organic liquid vehicle at room temperature and silica particles containing a water soluble dye entrapped therein, said silica particles being coated with a surfactant, wherein said toner particles are dispersed within the organic liquid vehicle.

16. A process for preparing particles which comprises preparing a mixture of a surfactant and an organic solvent immiscible with water and capable of forming a stable microemulsion with water, adding to the mixture a solution of a water-soluble dye, a hydrolyzing reagent, and water to form a microemulsion of water domains within a continuous phase of the organic solvent, and adding to the microemulsion a tetraalkoxysilane, wherein the tetraalkoxysilane reacts with the hydrolyzing agent to form in each water domain a silica particle containing the water-soluble dye and coated with the surfactant.

17. A process according to claim 16 wherein the surfactant is present in an amount such that from about 5 to about 40 percent by weight of the oil phase comprises the surfactant.

18. A process according to claim 16 wherein the ratio of organic solvent to water is from about 1:1 to about 15:1.

19. A process according to claim 16 wherein the organic solvent is selected from the group consisting of aliphatic hydrocarbons, aromatic hydrocarbons, substituted aromatic hydrocarbons, and mixtures thereof.

20. A process according to claim 16 wherein the dye is present in an amount such that from about 0.5 to about 30 percent by weight of the water phase comprises the dye.

21. A process according to claim 16 wherein the dye is detectable when exposed to radiation outside the visible wavelength range.

22. A process according to claim 16 wherein the hydrolyzing agent is present in an amount such that from about 10 to about 60 percent by weight of the water phase comprises the hydrolyzing agent.

23. A process according to claim 16 wherein the hydrolyzing agent is selected from the group consisting of ammonium hydroxide, sodium hydroxide, potassium hydroxide, organic amines, and mixtures thereof.

24. A process according to claim 16 wherein the tetraalkoxysilane is present in an amount such that from about 1 to about 30 percent by weight of the water phase comprises the tetraalkoxysilane.

25. A process according to claim 16 wherein the tetraalkoxysilane has from 1 to about 6 carbon atoms in the alkyl portion.

26. A process for preparing particles which comprises preparing a mixture of a surfactant and an organic solvent immiscible with water and capable of forming a stable microemulsion with water, adding to the mixture a solution of a hydrolyzing reagent and water to form a microemulsion of water domains within a continuous phase of the organic solvent, adding to the microemulsion a water-soluble dye to form a colored microemulsion, and adding to the colored microemulsion a tetraalkoxysilane, wherein the tetraalkoxysilane reacts with the hydrolyzing agent to form in each water domain a silica particle containing the water-soluble dye and coated with the surfactant.

27. A process according to claim 26 wherein the surfactant is present in an amount such that from about 5 to about 40 percent by weight of the oil phase comprises the surfactant.

28. A process according to claim 26 wherein the ratio of organic solvent to water is from about 1:1 to about 15:1.

29. A process according to claim 26 wherein the organic solvent is selected from the group consisting of aliphatic hydrocarbons, aromatic hydrocarbons, substituted aromatic hydrocarbons, and mixtures thereof.

30. A process according to claim 26 wherein the dye is present in an amount such that from about 0.5 to about 30 percent by weight of the water phase comprises the dye.

31. A process according to claim 26 wherein the dye is detectable when exposed to radiation outside the visible wavelength range.

32. A process according to claim 26 wherein the hydrolyzing agent is present in an amount such that from about 10 to about 60 percent by weight of the water phase comprises the hydrolyzing agent.

33. A process according to claim 26 wherein the hydrolyzing agent is selected from the group consisting of ammonium hydroxide, sodium hydroxide, potassium hydroxide, organic amines, and mixtures thereof.

34. A process according to claim 26 wherein the tetraalkoxysilane is present in an amount such that from about 1 to about 30 percent by weight of the water phase comprises the tetraalkoxysilane.

35. A process according to claim 26 wherein the tetraalkoxysilane has from 1 to about 6 carbon atoms in the alkyl portion.

36. A process for forming images which comprises (1) forming an electrostatic latent image on an imaging member; (2) developing the latent image with a toner comprising a resin and colorant particles which comprise silica particles containing a water soluble dye entrapped therein, said silica particles being coated with a surfactant; and (3) transferring the developed image to a substrate.

37. A hot melt ink jet ink which comprises a binder, a propellant, and colorant particles which comprise silica particles containing a water soluble dye entrapped therein, said silica particles being coated with a surfactant.

* * * * *